US011113602B2

(12) United States Patent
Shazeer et al.

(10) Patent No.: US 11,113,602 B2
(45) Date of Patent: Sep. 7, 2021

(54) ATTENTION-BASED SEQUENCE TRANSDUCTION NEURAL NETWORKS

(71) Applicant: Google LLC, Mountain View, CA (US)

(72) Inventors: Noam M. Shazeer, Palo Alto, CA (US); Aidan Nicholas Gomez, Toronto (CA); Lukasz Mieczyslaw Kaiser, Mountain View, CA (US); Jakob D. Uszkoreit, Portola Valley, CA (US); Llion Owen Jones, San Francisco, CA (US); Niki J. Parmar, Sunnyvale, CA (US); Illia Polosukhin, Mountain View, CA (US); Ashish Teku Vaswani, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/932,422

(22) Filed: Jul. 17, 2020

(65) Prior Publication Data

US 2020/0372357 A1    Nov. 26, 2020

Related U.S. Application Data

(63) Continuation of application No. 16/559,392, filed on Sep. 3, 2019, now Pat. No. 10,719,764, which is a
(Continued)

(51) Int. Cl.
*G06N 3/04* (2006.01)
*G06N 3/08* (2006.01)

(52) U.S. Cl.
CPC ............. *G06N 3/08* (2013.01); *G06N 3/04* (2013.01); *G06N 3/0454* (2013.01)

(58) Field of Classification Search
USPC .................................................. 706/15, 45
See application file for complete search history.

(56) References Cited

U.S. PATENT DOCUMENTS

| 2017/0124433 | A1 | 5/2017 | Chandraker et al. |
| 2018/0341860 | A1 | 11/2018 | Shazeer |
| 2020/0327359 | A1* | 10/2020 | Blundell .............. G06K 9/6215 |

FOREIGN PATENT DOCUMENTS

KR    1020150037986    4/2015

OTHER PUBLICATIONS

AU Examination Report in Australian Appln. No. 2018271931, dated Feb. 28, 2020, 3 pages.
(Continued)

*Primary Examiner* — David R Vincent
(74) *Attorney, Agent, or Firm* — Fish & Richardson P.C.

(57) ABSTRACT

Methods, systems, and apparatus, including computer programs encoded on a computer storage medium, for generating an output sequence from an input sequence. In one aspect, one of the systems includes an encoder neural network configured to receive the input sequence and generate encoded representations of the network inputs, the encoder neural network comprising a sequence of one or more encoder subnetworks, each encoder subnetwork configured to receive a respective encoder subnetwork input for each of the input positions and to generate a respective subnetwork output for each of the input positions, and each encoder subnetwork comprising: an encoder self-attention sub-layer that is configured to receive the subnetwork input for each of the input positions and, for each particular input position in the input order: apply an attention mechanism over the encoder subnetwork inputs using one or more queries derived from the encoder subnetwork input at the particular input position.

20 Claims, 3 Drawing Sheets

Related U.S. Application Data continuation of application No. 16/021,971, filed on Jun. 28, 2018, now Pat. No. 10,452,978, which is a continuation of application No. PCT/US2018/034224, filed on May 23, 2018.

(60) Provisional application No. 62/541,594, filed on Aug. 4, 2017, provisional application No. 62/510,256, filed on May 23, 2017.

(56) References Cited

OTHER PUBLICATIONS

AU Office Action in Australian Application No. 2018271931, dated Apr. 28, 2020, 3 pages.
Ba et al. "Layer Normalization," arXiv 1607.06450v1, Jul. 21, 2016, 14 pages.
Bahdanau et al. "Neural Machine Translation by Jointly Learning to Align and Translate," arXiv. 1409.0473v7, dated May 19, 2016, 15 pages.
Britz et al "Massive exploration of neural machine translation architectures," arXiv 1703.03906v2, Mar. 21, 2017, 9 pages.
CA Office Action in Canadian Application No. 2018271931, dated Feb. 28, 2020, 3 pages.
Cheng et al. "Long short-term memory-networks for machine reading," arXiv 1601.06733v7, Sep. 20, 2016, 11 pages.
Cho et al. "Learning phrase representations using rnn encoder-decoder for statistical machine translation," arXiv 1406.1078v3, Sep. 3, 2014, 15 pages.
Chollet. "Xception: Deep Learning with depthwise separable convolution," arXiv 1610.02357v3, Apr. 4, 2017, 8 pages.
Chung et al. "Empirical evaluation of gated recurrent neural networks on sequence modeling," arXiv 1412.3555v1, Dec. 11, 2014, 9 pages.
Daniluk et al., Frustratingly Short Attention Spans in Neural Language Modeling, (Feb. 2017) ICLR 2017, available from Internet <https://arxiv.org/abs/1702.04521> at p. 1-10.
Gehring et al. "Convolutional sequence to sequence learning," arXiv 1705.03122v2, May 12, 2017, 15 pages.
Hochreiter et al. "Gradient flow in recurrent nets: the difficulty of learning long-term dependencies," A field Guide to Dynamical Recurrent Neural Networks, IEEE Press, 2001a, 15 pages.
Hochreiter et al. "Long short term memory," Neural Computation 9(8), Nov. 1997, 46 pages.
Jozefowiz et al. "Exploring the limits of language modeling," arXiv 1602.02410, Feb. 7, 2016, 11 pages.
JP Office Action in Japanese Application No. 2019-538514, dated Jul. 20, 2020, 4 pages (with English translation).
Kaiser et al. "Can active memory replace attention?" Advances in Neural Information Processing Systems, Dec. 2016 9 pages.
Kaiser et al. "Neural GPUs learn algorithms," International Conference on Learning Representations, arXiv 1511.08228v3, Mar. 15, 2016, 9 pages.
Kalchbrenner et al. "Neural machine translation in linear time," arXiv 1610.10099v2, Mar. 15, 2017, 9 pages.
Kim et al. "Structured attention networks," arXiv 1702.00887v3, Feb. 16, 2017, 21 pages.
Kingma et al. "Adam: A method for stochastic optimization," arXiv 1412.6980v8_July 23, 2015, 15 pages.
Kuchaiev et al. "Factorization tricks for lstm networks," arXiv 1703.10722v3, Feb. 24, 2018, 6 pages.
Lin et al. "A structured self-attentive sentence embedding," arXiv 1703.03130v1, Mar. 9, 2017, 15 pages.
Luong et al. "Effective approaches to attention based neural machine translation," arXiv 1508.04025v2, Sep. 20, 2015, 11 pages.
Parikh et al. "A decomposable attention model for natural language inference," Proceedings of the Empirical Methods in Natural Language Processing conference, Nov. 2016, 7 pages.
Paulus et al. "A deep reinforced model for abstractive summarization," arXiv 1705.04304v3, Nov. 13, 2017, 12 pages.
PCT International Preliminary Report on Patentability issued in International Application No. PCT/US2018/034224, dated Nov. 26, 2019, 8 pages.
PCT International Search Report and Written Opinion issued in International Application No. PCT/US2018/034224, dated Sep. 24, 2018, 14 pages.
Sennrich et al. "Neural Machine Translation of rare words with subword units," arXiv 1508.07909v5, Jun. 10, 2016, 11 pages.
Shazeer et al. "Outrageously large neural networks: The sparsely-gated mixture-of-experts layer," arXiv 1701.06538v1, Jan. 23, 2017, 19 pages.
Srivastava et al. "Dropout: a simple way to prevent neural network from overfilling," Journal of Machine Learning Research, 15(1), Jan. 2014, 30 pages.
Sukhbaatar et al., End-to-End Memory Networks, (2015) available from Internet <https://arxiv.org/pdf/1503.08895.pdf> at p. 1-11.
Sutskever et al. "Sequence to sequence learning with neural networks," Advances in Neural Information Processing Systems, Dec. 2014, 9 pages.
Szegedy et al. "Rethinking the inception architecture for computer vision," Proceedings of the IEEE Conference on Computer Vision and Pattern Recognition, Jun. 2016, 9 pages.
Vaswan et al. "Attention is All You Need," 31st Conference on Neural Information Processing Systems, Jun. 12, 2017, arXIv1706.03762, 15 pages.
Wu et al. "Google's neural machine translation system: Bridging the gap between human and machine translation," arXiv 1609.08144v2, Oct. 8, 2016, 23 pages.
KR Notice of Allowance in Korean Application No. 10-2019-7019186, dated Sep. 3, 2020, 4 pages (with English translation).
RU Office Action in Russian Application No. 2019122632/28, dated Sep. 1, 2020, 14 pages (with English translation).
JP Office Action in Japanese Application No. 2019-538514, dated Jan. 4, 2021, 6 pages (with English translation).
IN Office Action in Indian Application No. 201927025719, dated May 5, 2021, 7 pages (with English translation).

* cited by examiner

ATTENTION-BASED SEQUENCE TRANSDUCTION NEURAL NETWORKS

CROSS-REFERENCE TO RELATED APPLICATIONS

This application is a continuation of and claims priority to U.S. application Ser. No. 16/559,392, filed on Sep. 3, 2019, which is a continuation of and claims priority to U.S. application Ser. No. 16/021,971, filed on Jun. 28, 2018 (now U.S. Pat. No. 10,452,978), which is a continuation of and claims priority to PCT Application No. PCT/US2018/034224, filed on May 23, 2018, which claims priority to U.S. Provisional Application No. 62/510,256, filed on May 23, 2017, and U.S. Provisional Application No. 62/541,594, filed on Aug. 4, 2017. The entire contents of the foregoing applications are hereby incorporated by reference.

BACKGROUND

This specification relates to transducing sequences using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that generates an output sequence that includes a respective output at each of multiple positions in an output order from an input sequence that includes a respective input at each of multiple positions in an input order, i.e., transduces the input sequence into the output sequence. In particular, the system generates the output sequence using an encoder neural network and a decoder neural network that are both attention-based.

Particular embodiments of the subject matter described in this specification can be implemented so as to realize one or more of the following advantages.

Many existing approaches to sequence transduction using neural networks use recurrent neural networks in both the encoder and the decoder. While these kinds of networks can achieve good performance on sequence transduction tasks, their computation is sequential in nature, i.e., a recurrent neural network generates an output at a current time step conditioned on the hidden state of the recurrent neural network at the preceding time step. This sequential nature precludes parallelization, resulting in long training and inference times and, accordingly, workloads that utilize a large amount of computational resources.

On the other hand, because the encoder and the decoder of the described sequence transduction neural network are attention-based, the sequence transduction neural network can transduce sequences quicker, be trained faster, or both, because the operation of the network can be more easily parallelized. That is, because the described sequence transduction neural network relies entirely on an attention mechanism to draw global dependencies between input and output and does not employ any recurrent neural network layers, the problems with long training and inference times and high resource usage caused by the sequential nature of recurrent neural network layers are mitigated.

Moreover, the sequence transduction neural network can transduce sequences more accurately than existing networks that are based on convolutional layers or recurrent layers, even though training and inference times are shorter. In particular, in conventional models, the number of operations required to relate signals from two arbitrary input or output positions grows with the distance between positions, e.g., either linearly or logarithmically depending on the model architecture. This makes it more difficult to learn dependencies between distant positions during training. In the presently described sequence transduction neural network, this number of operations is reduced to a constant number of operations because of the use of attention (and, in particular, self-attention) while not relying on recurrence or convolutions. Self-attention, sometimes called intra-attention, is an attention mechanism relating different positions of a single sequence in order to compute a representation of the sequence. The use of attention mechanisms allows the sequence transduction neural network to effectively learn dependencies between distant positions during training, improving the accuracy of the sequence transduction neural network on various transduction tasks, e.g., machine translation. In fact, the described sequence transduction neural network can achieve state-of-the-art results on the machine translation task despite being easier to train and quicker to generate outputs than conventional machine translation neural networks. The sequence transduction neural network can also exhibit improved performance over conventional machine translation neural networks without task-specific tuning through the use of the attention mechanism.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that generates an output sequence that includes a respective output at each of multiple positions in an output order from an input sequence that includes a respective input at each of multiple positions in an input order, i.e., transduces the input sequence into the output sequence.

For example, the system may be a neural machine translation system. That is, if the input sequence is a sequence of words in an original language, e.g., a sentence or phrase, the output sequence may be a translation of the input sequence into a target language, i.e., a sequence of words in the target language that represents the sequence of words in the original language.

As another example, the system may be a speech recognition system. That is, if the input sequence is a sequence of audio data representing a spoken utterance, the output sequence may be a sequence of graphemes, characters, or words that represents the utterance, i.e., is a transcription of the input sequence.

As another example, the system may be a natural language processing system. For example, if the input sequence is a sequence of words in an original language, e.g., a sentence or phrase, the output sequence may be a summary of the input sequence in the original language, i.e., a sequence that has fewer words than the input sequence but that retains the essential meaning of the input sequence. As another example, if the input sequence is a sequence of words that form a question, the output sequence can be a sequence of words that form an answer to the question.

As another example, the system may be part of a computer-assisted medical diagnosis system. For example, the input sequence can be a sequence of data from an electronic medical record and the output sequence can be a sequence of predicted treatments.

As another example, the system may be part of an image processing system. For example, the input sequence can be an image, i.e., a sequence of color values from the image, and the output can be a sequence of text that describes the image. As another example, the input sequence can be a sequence of text or a different context and the output sequence can be an image that describes the context.

In particular, the neural network includes an encoder neural network and a decoder neural network. Generally, both the encoder and the decoder are attention-based, i.e., both apply an attention mechanism over their respective received inputs while transducing the input sequence. In some cases, neither the encoder nor the decoder include any convolutional layers or any recurrent layers.

Figure 1:
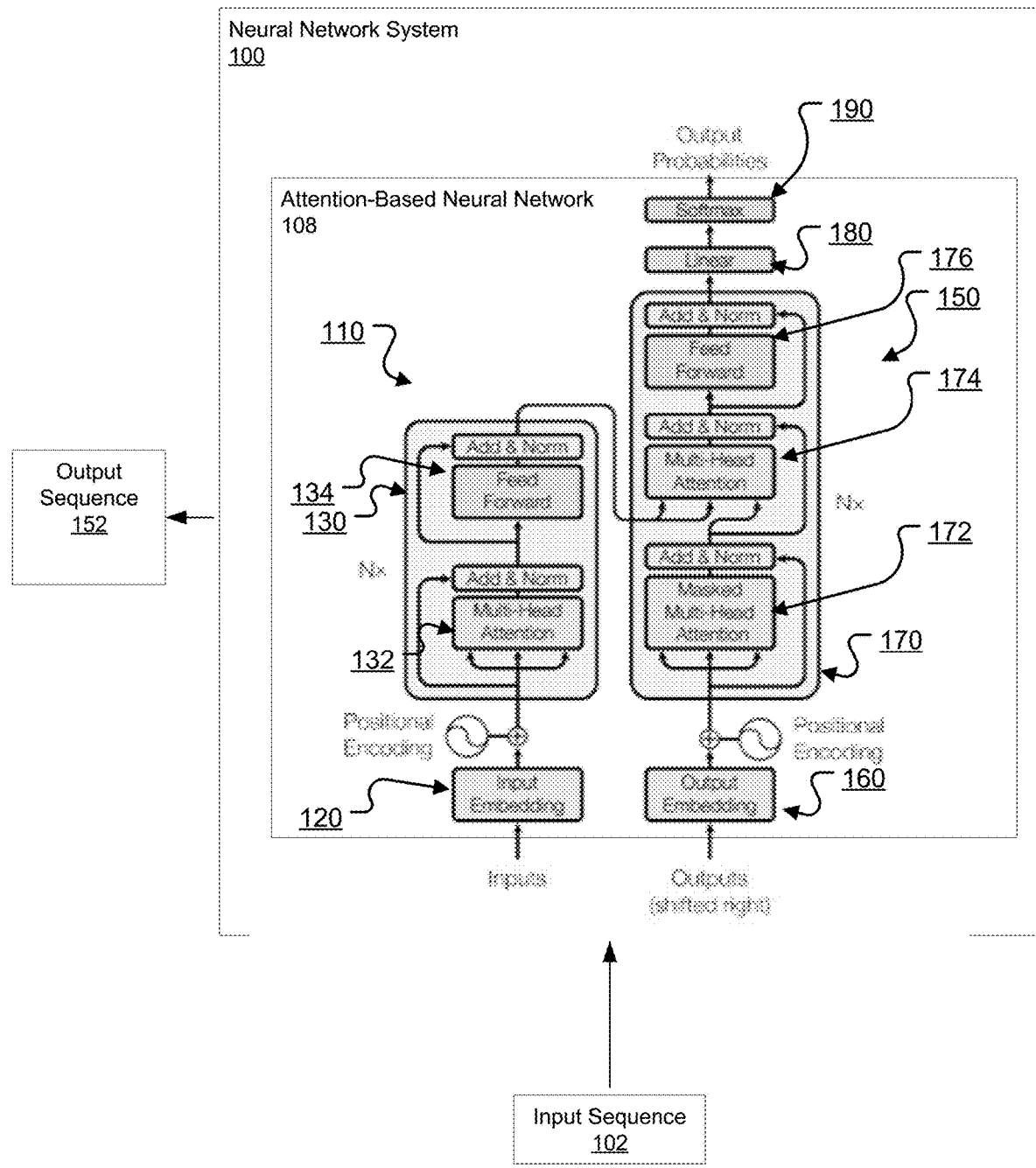
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 receives an input sequence 102 and processes the input sequence 102 to transduce the input sequence 102 into an output sequence 152.

The input sequence 102 has a respective network input at each of multiple input positions in an input order and the output sequence 152 has a respective network output at each of multiple output positions in an output order. That is, the input sequence 102 has multiple inputs arranged according to an input order and the output sequence 152 has multiple outputs arranged according to an output order.

As described above, the neural network system 100 can perform any of a variety of tasks that require processing sequential inputs to generate sequential outputs.

The neural network system 100 includes an attention-based sequence transduction neural network 108, which in turn includes an encoder neural network 110 and a decoder neural network 150.

The encoder neural network 110 is configured to receive the input sequence 102 and generate a respective encoded representation of each of the network inputs in the input sequence. Generally, an encoded representation is a vector or other ordered collection of numeric values.

The decoder neural network 150 is then configured to use the encoded representations of the network inputs to generate the output sequence 152.

Generally, and as will be described in more detail below, both the encoder 110 and the decoder 150 are attention-based. In some cases, neither the encoder nor the decoder include any convolutional layers or any recurrent layers.

The encoder neural network 110 includes an embedding layer 120 and a sequence of one or more encoder subnetworks 130. In particular, as shown in FIG. 1, the encoder neural network includes N encoder subnetworks 130.

The embedding layer 120 is configured to, for each network input in the input sequence, map the network input to a numeric representation of the network input in an embedding space, e.g., into a vector in the embedding space. The embedding layer 120 then provides the numeric representations of the network inputs to the first subnetwork in the sequence of encoder subnetworks 130, i.e., to the first encoder subnetwork 130 of the N encoder subnetworks 130.

In particular, in some implementations, the embedding layer 120 is configured to map each network input to an embedded representation of the network input and then combine, e.g., sum or average, the embedded representation of the network input with a positional embedding of the input position of the network input in the input order to generate a combined embedded representation of the network input. That is, each position in the input sequence has a corresponding embedding and for each network input the embedding layer 120 combines the embedded representation of the network input with the embedding of the network input's position in the input sequence. Such positional embeddings can enable the model to make full use of the order of the input sequence without relying on recurrence or convolutions.

In some cases, the positional embeddings are learned. As used in this specification, the term "learned" means that an operation or a value has been adjusted during the training of the sequence transduction neural network 108. Training the sequence transduction neural network 108 is described below with reference to FIG. 3.

In some other cases, the positional embeddings are fixed and are different for each position. For example, the embeddings can be made up of sine and cosine functions of different frequencies and can satisfy:

$$PE_{(pos,2i)}=\sin(pos10000^{2i/d_{model}})$$

$$PE_{(pos,2i+1)}=\cos(pos10000^{2i/d_{model}}),$$

where pos is the position, i is the dimension within the positional embedding, and $d_{model}$ is the dimensionality of the positional embedding (and of the other vectors processed by the neural network 108). The use of sinusoidal positional embeddings may allow the model to extrapolate to longer sequence lengths, which can increase the range of applications for which the model can be employed.

The combined embedded representation is then used as the numeric representation of the network input.

Each of the encoder subnetworks 130 is configured to receive a respective encoder subnetwork input for each of the plurality of input positions and to generate a respective subnetwork output for each of the plurality of input positions.

The encoder subnetwork outputs generated by the last encoder subnetwork in the sequence are then used as the encoded representations of the network inputs.

For the first encoder subnetwork in the sequence, the encoder subnetwork input is the numeric representations generated by the embedding layer 120, and, for each encoder subnetwork other than the first encoder subnetwork in the sequence, the encoder subnetwork input is the encoder subnetwork output of the preceding encoder subnetwork in the sequence.

Each encoder subnetwork 130 includes an encoder self-attention sub-layer 132. The encoder self-attention sub-layer 132 is configured to receive the subnetwork input for each of the plurality of input positions and, for each particular input position in the input order, apply an attention mechanism over the encoder subnetwork inputs at the input positions using one or more queries derived from the encoder subnetwork input at the particular input position to generate a respective output for the particular input position. In some cases, the attention mechanism is a multi-head attention mechanism. The attention mechanism and how the attention mechanism is applied by the encoder self-attention sub-layer 132 will be described in more detail below with reference to FIG. 2.

In some implementations, each of the encoder subnetworks 130 also includes a residual connection layer that combines the outputs of the encoder self-attention sub-layer with the inputs to the encoder self-attention sub-layer to generate an encoder self-attention residual output and a layer normalization layer that applies layer normalization to the encoder self-attention residual output. These two layers are collectively referred to as an "Add & Norm" operation in FIG. 1.

Some or all of the encoder subnetworks can also include a position-wise feed-forward layer 134 that is configured to operate on each position in the input sequence separately. In particular, for each input position, the feed-forward layer 134 is configured receive an input at the input position and apply a sequence of transformations to the input at the input position to generate an output for the input position. For example, the sequence of transformations can include two or more learned linear transformations each separated by an activation function, e.g., a non-linear elementwise activation function, e.g., a ReLU activation function, which can allow for faster and more effective training on large and complex datasets. The inputs received by the position-wise feed-forward layer 134 can be the outputs of the layer normalization layer when the residual and layer normalization layers are included or the outputs of the encoder self-attention sub-layer 132 when the residual and layer normalization layers are not included. The transformations applied by the layer 134 will generally be the same for each input position (but different feed-forward layers in different subnetworks will apply different transformations).

In cases where an encoder subnetwork 130 includes a position-wise feed-forward layer 134, the encoder subnetwork can also include a residual connection layer that combines the outputs of the position-wise feed-forward layer with the inputs to the position-wise feed-forward layer to generate an encoder position-wise residual output and a layer normalization layer that applies layer normalization to the encoder position-wise residual output. These two layers are also collectively referred to as an "Add & Norm" operation in FIG. 1. The outputs of this layer normalization layer can then be used as the outputs of the encoder subnetwork 130.

Once the encoder neural network 110 has generated the encoded representations, the decoder neural network 150 is configured to generate the output sequence in an auto-regressive manner.

That is, the decoder neural network 150 generates the output sequence, by at each of a plurality of generation time steps, generating a network output for a corresponding output position conditioned on (i) the encoded representations and (ii) network outputs at output positions preceding the output position in the output order.

In particular, for a given output position, the decoder neural network generates an output that defines a probability distribution over possible network outputs at the given output position. The decoder neural network can then select a network output for the output position by sampling from the probability distribution or by selecting the network output with the highest probability.

Because the decoder neural network 150 is auto-regressive, at each generation time step, the decoder 150 operates on the network outputs that have already been generated before the generation time step, i.e., the network outputs at output positions preceding the corresponding output position in the output order. In some implementations, to ensure this is the case during both inference and training, at each generation time step the decoder neural network 150 shifts the already generated network outputs right by one output order position (i.e., introduces a one position offset into the already generated network output sequence) and (as will be described in more detail below) masks certain operations so that positions can only attend to positions up to and including that position in the output sequence (and not subsequent positions). While the remainder of the description below describes that, when generating a given output at a given output position, various components of the decoder 150 operate on data at output positions preceding the given output positions (and not on data at any other output positions), it will be understood that this type of conditioning can be effectively implemented using the shifting described above.

The decoder neural network 150 includes an embedding layer 160, a sequence of decoder subnetworks 170, a linear layer 180, and a softmax layer 190. In particular, as shown in FIG. 1, the decoder neural network includes N decoder subnetworks 170. However, while the example of FIG. 1 shows the encoder 110 and the decoder 150 including the same number of subnetworks, in some cases the encoder 110 and the decoder 150 include different numbers of subnetworks. That is, the decoder 150 can include more or fewer subnetworks than the encoder 110.

The embedding layer 160 is configured to, at each generation time step, for each network output at an output position that precedes the current output position in the output order, map the network output to a numeric representation of the network output in the embedding space. The embedding layer 160 then provides the numeric representations of the network outputs to the first subnetwork 170 in the sequence of decoder subnetworks, i.e., to the first decoder subnetwork 170 of the N decoder subnetworks.

In particular, in some implementations, the embedding layer 160 is configured to map each network output to an embedded representation of the network output and combine the embedded representation of the network output with a positional embedding of the output position of the network output in the output order to generate a combined embedded representation of the network output. The combined embedded representation is then used as the numeric representation of the network output. The embedding layer 160 generates the combined embedded representation in the same manner as described above with reference to the embedding layer 120.

Each decoder subnetwork 170 is configured to, at each generation time step, receive a respective decoder subnetwork input for each of the plurality of output positions preceding the corresponding output position and to generate a respective decoder subnetwork output for each of the plurality of output positions preceding the corresponding output position (or equivalently, when the output sequence has been shifted right, each network output at a position up to and including the current output position).

In particular, each decoder subnetwork 170 includes two different attention sub-layers: a decoder self-attention sub-layer 172 and an encoder-decoder attention sub-layer 174.

Each decoder self-attention sub-layer 172 is configured to, at each generation time step, receive an input for each output position preceding the corresponding output position and, for each of the particular output positions, apply an attention mechanism over the inputs at the output positions preceding the corresponding position using one or more queries derived from the input at the particular output position to generate a updated representation for the particular output position. That is, the decoder self-attention sub-layer 172 applies an attention mechanism that is masked so that it does not attend over or otherwise process any data that is not at a position preceding the current output position in the output sequence.

Each encoder-decoder attention sub-layer 174, on the other hand, is configured to, at each generation time step, receive an input for each output position preceding the corresponding output position and, for each of the output positions, apply an attention mechanism over the encoded representations at the input positions using one or more queries derived from the input for the output position to generate an updated representation for the output position. Thus, the encoder-decoder attention sub-layer 174 applies attention over encoded representations while the encoder self-attention sub-layer 172 applies attention over inputs at output positions.

The attention mechanism applied by each of these attention sub-layers will be described in more detail below with reference to FIG. 2.

In FIG. 1, the decoder self-attention sub-layer 172 is shown as being before the encoder-decoder attention sub-layer in the processing order within the decoder subnetwork 170. In other examples, however, the decoder self-attention sub-layer 172 may be after the encoder-decoder attention sub-layer 174 in the processing order within the decoder subnetwork 170 or different subnetworks may have different processing orders.

In some implementations, each decoder subnetwork 170 includes, after the decoder self-attention sub-layer 172, after the encoder-decoder attention sub-layer 174, or after each of the two sub-layers, a residual connection layer that combines the outputs of the attention sub-layer with the inputs to the attention sub-layer to generate a residual output and a layer normalization layer that applies layer normalization to the residual output. FIG. 1 shows these two layers being inserted after each of the two sub-layers, both referred to as an "Add & Norm" operation.

Some or all of the decoder subnetwork 170 also include a position-wise feed-forward layer 176 that is configured to operate in a similar manner as the position-wise feed-forward layer 134 from the encoder 110. In particular, the layer 176 is configured to, at each generation time step: for each output position preceding the corresponding output position: receive an input at the output position, and apply a sequence of transformations to the input at the output position to generate an output for the output position. For example, the sequence of transformations can include two or more learned linear transformations each separated by an activation function, e.g., a non-linear elementwise activation function, e.g., a ReLU activation function. The inputs received by the position-wise feed-forward layer 176 can be the outputs of the layer normalization layer (following the last attention sub-layer in the subnetwork 170) when the residual and layer normalization layers are included or the outputs of the last attention sub-layer in the subnetwork 170 when the residual and layer normalization layers are not included.

In cases where a decoder subnetwork 170 includes a position-wise feed-forward layer 176, the decoder subnetwork can also include a residual connection layer that combines the outputs of the position-wise feed-forward layer with the inputs to the position-wise feed-forward layer to generate a decoder position-wise residual output and a layer normalization layer that applies layer normalization to the decoder position-wise residual output. These two layers are also collectively referred to as an "Add & Norm" operation in FIG. 1. The outputs of this layer normalization layer can then be used as the outputs of the decoder subnetwork 170.

At each generation time step, the linear layer 180 applies a learned linear transformation to the output of the last decoder subnetwork 170 in order to project the output of the last decoder subnetwork 170 into the appropriate space for processing by the softmax layer 190. The softmax layer 190 then applies a softmax function over the outputs of the linear layer 180 to generate the probability distribution over the possible network outputs at the generation time step. As described above, the decoder 150 can then select a network output from the possible network outputs using the probability distribution.

Figure 2:
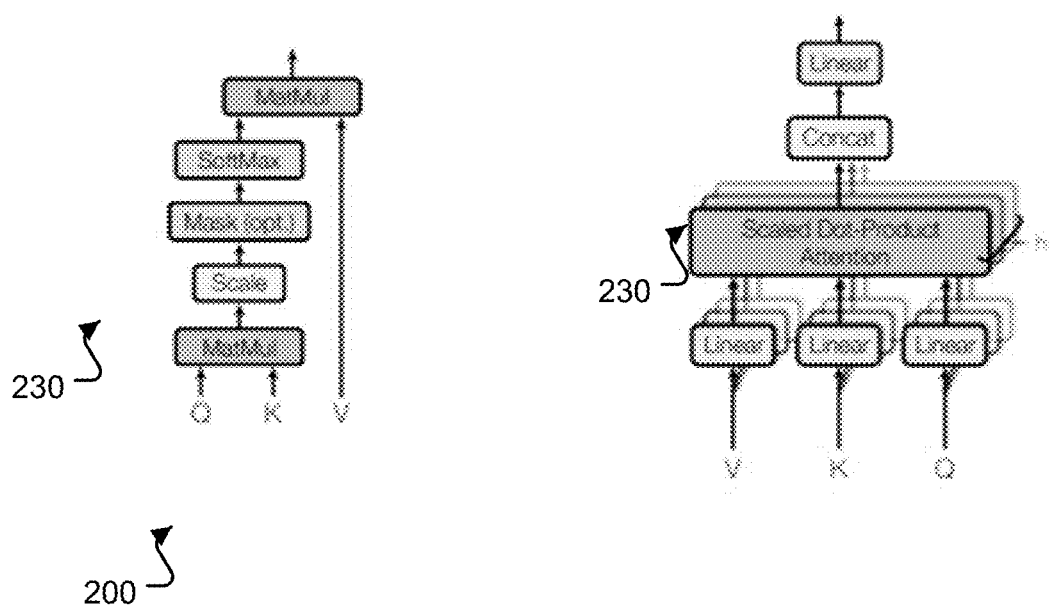
FIG. 2 is a diagram showing attention mechanisms that are applied by the attention sub-layers in the subnetworks of the encoder neural network and the decoder neural network.

FIG. 2 is a diagram 200 showing attention mechanisms that are applied by the attention sub-layers in the subnetworks of the encoder neural network 110 and the decoder neural network 150.

Generally, an attention mechanism maps a query and a set of key-value pairs to an output, where the query, keys, and values are all vectors. The output is computed as a weighted sum of the values, where the weight assigned to each value is computed by a compatibility function of the query with the corresponding key.

More specifically, each attention sub-layer applies a scaled dot-product attention mechanism 230. In scaled dot-product attention, for a given query, the attention sub-layer computes the dot products of the query with all of the keys, divides each of the dot products by a scaling factor, e.g., by the square root of the dimensions of the queries and keys, and then applies a softmax function over the scaled dot products to obtain the weights on the values. The attention sub-layer then computes a weighted sum of the values in accordance with these weights. Thus, for scaled dot-product attention the compatibility function is the dot product and the output of the compatibility function is further scaled by the scaling factor.

In operation and as shown in the left hand side of FIG. 2, the attention sub-layer computes the attention over a set of queries simultaneously. In particular, the attention sub-layer packs the queries into a matrix Q, packs the keys into a matrix K, and packs the values into a matrix V. To pack a set of vectors into a matrix, the attention sub-layer can generate a matrix that includes the vectors as the rows of the matrix.

The attention sub-layer then performs a matrix multiply (MatMul) between the matrix Q and the transpose of the matrix K to generate a matrix of compatibility function outputs.

The attention sub-layer then scales the compatibility function output matrix, i.e., by dividing each element of the matrix by the scaling factor.

The attention sub-layer then applies a softmax over the scaled output matrix to generate a matrix of weights and performs a matrix multiply (MatMul) between the weight matrix and the matrix V to generate an output matrix that includes the output of the attention mechanism for each of the values.

For sub-layers that use masking, i.e., decoder attention sub-layers, the attention sub-layer masks the scaled output matrix before applying the softmax. That is, the attention sub-layer masks out (sets to negative infinity), all values in the scaled output matrix that correspond to positions after the current output position.

In some implementations, to allow the attention sub-layers to jointly attend to information from different representation subspaces at different positions, the attention sub-layers employ multi-head attention, as illustrated on the right hand side of FIG. 2.

In particular, to implement multi-ahead attention, the attention sub-layer applies h different attention mechanisms in parallel. In other words, the attention sub-layer includes h different attention layers, with each attention layer within the same attention sub-layer receiving the same original queries Q, original keys K, and original values V.

Each attention layer is configured to transform the original queries, and keys, and values using learned linear transformations and then apply the attention mechanism 230 to the transformed queries, keys, and values. Each attention layer will generally learn different transformations from each other attention layer in the same attention sub-layer.

In particular, each attention layer is configured to apply a learned query linear transformation to each original query to generate a layer-specific query for each original query, apply a learned key linear transformation to each original key to generate a layer-specific key for each original key, and apply a learned value linear transformation to each original value to generate a layer-specific values for each original value. The attention layer then applies the attention mechanism described above using these layer-specific queries, keys, and values to generate initial outputs for the attention layer.

The attention sub-layer then combines the initial outputs of the attention layers to generate the final output of the attention sub-layer. As shown in FIG. 2, the attention sub-layer concatenates (concat) the outputs of the attention layers and applies a learned linear transformation to the concatenated output to generate the output of the attention sub-layer.

In some cases, the learned transformations applied by the attention sub-layer reduce the dimensionality of the original keys and values and, optionally, the queries. For example, when the dimensionality of the original keys, values, and queries is d and there are h attention layers in the sub-layer, the sub-layer may reduce the dimensionality of the original keys, values, and queries to d/h. This keeps the computation cost of the multi-head attention mechanism similar to what the cost would have been to perform the attention mechanism once with full dimensionality while at the same time increasing the representative capacity of the attention sub-layer.

While the attention mechanism applied by each attention sub-layer is the same, the queries, keys, and values are different for different types of attention. That is, different types of attention sub-layers use different sources for the original queries, keys, and values that are received as input by the attention sub-layer.

In particular, when the attention sub-layer is an encoder self-attention sub-layer, all of the keys, values and queries come from the same place, in this case, the output of the previous subnetwork in the encoder, or, for the encoder self-attention sub-layer in first subnetwork, the embeddings of the inputs and each position in the encoder can attend to all positions in the input order. Thus, there is a respective key, value, and query for each position in the input order.

When the attention sub-layer is a decoder self-attention sub-layer, each position in the decoder attends to all positions in the decoder preceding that position. Thus, all of the keys, values, and queries come from the same place, in this case, the output of the previous subnetwork in the decoder, or, for the decoder self-attention sub-layer in the first decoder subnetwork, the embeddings of the outputs already generated. Thus, there is a respective key, value, and query for each position in the output order before the current position.

When the attention sub-layer is an encoder-decoder attention sub-layer, the queries come from the previous component in the decoder and the keys and values come from the output of the encoder, i.e., from the encoded representations generated by the encoder. This allows every position in the decoder to attend over all positions in the input sequence. Thus, there is a respective query for each for each position in the output order before the current position and a respective key and a respective value for each position in the input order.

In more detail, when the attention sub-layer is an encoder self-attention sub-layer, for each particular input position in the input order, the encoder self-attention sub-layer is configured to apply an attention mechanism over the encoder subnetwork inputs at the input positions using one or more queries derived from the encoder subnetwork input at the particular input position to generate a respective output for the particular input position.

When the encoder self-attention sub-layer implements multi-head attention, each encoder self-attention layer in the encoder self-attention sub-layer is configured to: apply a learned query linear transformation to each encoder subnetwork input at each input position to generate a respective query for each input position, apply a learned key linear transformation to each encoder subnetwork input at each input position to generate a respective key for each input position, apply a learned value linear transformation to each encoder subnetwork input at each input position to generate a respective value for each input position, and then apply the attention mechanism (i.e., the scaled dot-product attention mechanism described above) using the queries, keys, and values to determine an initial encoder self-attention output for each input position. The sub-layer then combines the initial outputs of the attention layers as described above.

When the attention sub-layer is a decoder self-attention sub-layer, the decoder self-attention sub-layer is configured to, at each generation time step: receive an input for each output position preceding the corresponding output position and, for each of the particular output positions, apply an attention mechanism over the inputs at the output positions preceding the corresponding position using one or more queries derived from the input at the particular output position to generate a updated representation for the particular output position.

When the decoder self-attention sub-layer implements multi-head attention, each attention layer in the decoder self-attention sub-layer is configured to, at each generation time step, apply a learned query linear transformation to the input at each output position preceding the corresponding output position to generate a respective query for each output position, apply a learned key linear transformation to each input at each output position preceding the corresponding output position to generate a respective key for each output position, apply a learned value linear transformation to each input at each output position preceding the corresponding output position to generate a respective key for each output position, and then apply the attention mechanism (i.e., the scaled dot-product attention mechanism described above) using the queries, keys, and values to determine an initial decoder self-attention output for each of the output positions. The sub-layer then combines the initial outputs of the attention layers as described above.

When the attention sub-layer is an encoder-decoder attention sub-layer, the encoder-decoder attention sub-layer is configured to, at each generation time step: receive an input for each output position preceding the corresponding output position and, for each of the output positions, apply an attention mechanism over the encoded representations at the input positions using one or more queries derived from the input for the output position to generate an updated representation for the output position.

When the encoder-decoder attention sub-layer implements multi-head attention, each attention layer is configured to, at each generation time step: apply a learned query linear transformation to the input at each output position preceding the corresponding output position to generate a respective query for each output position, apply a learned key linear transformation to each encoded representation at each input position to generate a respective key for each input position, apply a learned value linear transformation to each encoded representation at each input position to generate a respective value for each input position, and then apply the attention mechanism (i.e., the scaled dot-product attention mechanism described above) using the queries, keys, and values to determine an initial encoder-decoder attention output for each input position. The sub-layer then combines the initial outputs of the attention layers as described above.

Figure 3:
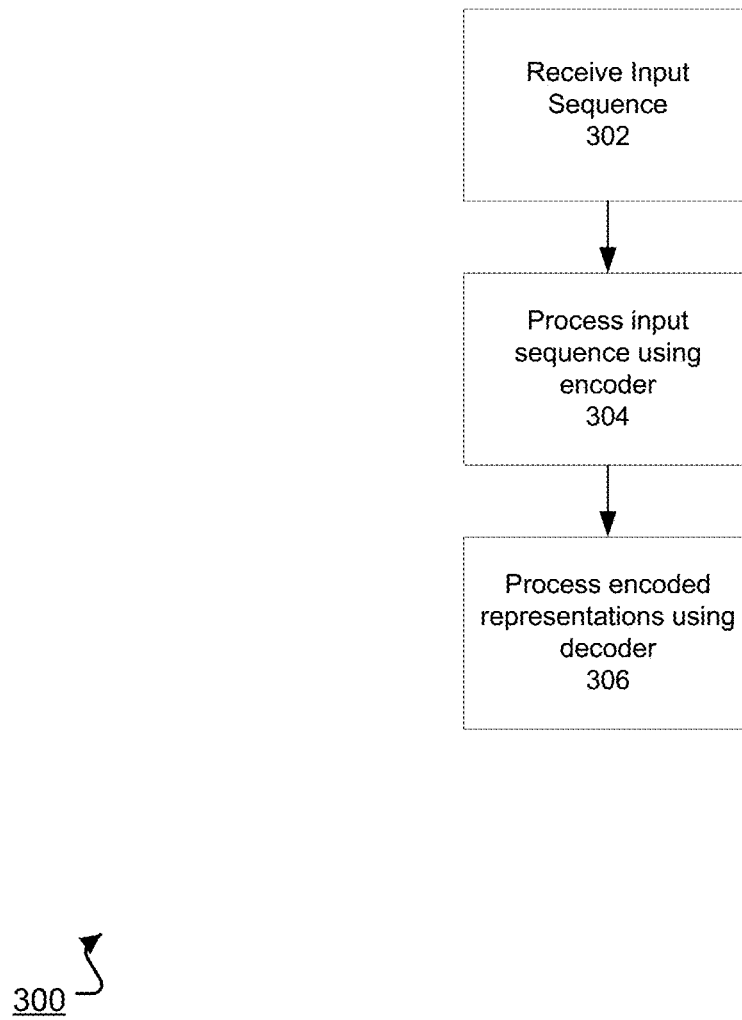
FIG. 3 is a flow diagram of an example process for generating an output sequence from an input sequence.

FIG. 3 is a flow diagram of an example process for generating an output sequence from an input sequence. For convenience, the process 300 will be described as being performed by a system of one or more computers located in one or more locations. For example, a neural network system, e.g., neural network system 100 of FIG. 1, appropriately programmed in accordance with this specification, can perform the process 300.

The system receives an input sequence (step 310).

The system processes the input sequence using the encoder neural network to generate a respective encoded representation of each of the network inputs in the input sequence (step 320). In particular, the system processes the input sequence through the embedding layer to generate an embedded representation of each network input and then process the embedded representations through the sequence of encoder subnetworks to generate the encoded representations of the network inputs.

The system processes the encoded representations using the decoder neural network to generate an output sequence (step 330). The decoder neural network is configured to generate the output sequence from the encoded representations in an auto-regressive manner. That is, the decoder neural network generates one output from the output sequence at each generation time step. At a given generation time step at which a given output is being generated, the system processes the outputs before the given output in the output sequence through the embedding layer in the decoder to generate embedded representations. The system then processes the embedded representations through the sequence of decoder subnetworks, the linear layer, and the softmax layer to generate the given output. Because the decoder subnetworks include encoder-decoder attention sub-layers as well as decoder self-attention sub-layers, the decoder makes use of both the already generated outputs and the encoded representations when generating the given output.

The system can perform the process 300 for input sequences for which the desired output, i.e., the output sequence that should be generated by the system for the input sequence, is not known.

The system can also perform the process 300 on input sequences in a set of training data, i.e., a set of inputs for which the output sequence that should be generated by the system is known, in order to train the encoder and the decoder to determine trained values for the parameters of the encoder and decoder. The process 300 can be performed repeatedly on inputs selected from a set of training data as part of a conventional machine learning training technique to train the initial neural network layers, e.g., a gradient descent with backpropagation training technique that uses a conventional optimizer, e.g., the Adam optimizer. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the sequence transduction neural network in parallel.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed by the one or more computers cause the one or more computers to implement a neural network for generating a network output by processing an input sequence having a respective network input at each of a plurality of input positions in an input order, the neural network comprising:
   a first neural network comprising a sequence of one or more subnetworks, each subnetwork configured to, at each of a plurality of time steps, (i) receive a respective subnetwork input for each of a plurality of preceding input positions that precede a current input position corresponding to the time step, and (ii) generate a respective subnetwork output for each preceding input position, and wherein each subnetwork comprises:
      a self-attention sub-layer that is configured to, at each time step, receive the respective subnetwork input for each of the plurality of preceding input positions and, for each particular input position of the preceding input positions:
         apply a self-attention mechanism over the subnetwork inputs at the preceding input positions to generate a respective output for the particular input position, wherein applying a self-attention mechanism comprises: determining a query according to the subnetwork input at the particular input position, determining keys according to the subnetwork inputs at the preceding input positions, determining values according to the subnetwork inputs at the preceding input positions, and using the determined query, keys, and values to generate the respective output for the particular input position.

2. The system of claim 1, wherein:
   the network output is an output sequence having a respective network output at each of a plurality of output positions in an output order; and
   the first neural network auto-regressively generates the output sequence, by at each of a plurality of time steps, generating a network output at an output position corresponding to the time step conditioned on the subnetwork inputs and network outputs at output positions preceding the output position in the output order.

3. The system of claim 1, wherein the first neural network further comprises:
   an embedding layer configured to, at each time step:
      for the network input at each of the plurality of preceding input positions:
         map the network input to an embedded representation of the network input, and
         combine the embedded representation of the network input with a positional embedding of the corresponding input position of the network input in the input order to generate a combined embedded representation of the network input; and
      provide the combined embedded representations of the network input as input to a first subnetwork in the sequence of subnetworks.

4. The system of claim 1, wherein at least one of the subnetworks comprises:
   a position-wise feed-forward layer that is configured to, at each time step:
      for each particular input position of the plurality of preceding input positions:
         receive an input at the particular input position, and
         apply a sequence of transformations to the input at the particular input position to generate an output for the particular input position.

5. The system of claim 4, wherein the sequence of transformations comprises two learned linear transformations separated by an activation function.

6. The system of claim 4, wherein the at least one subnetwork further comprises:
   a residual connection layer that combines the outputs of the position-wise feed-forward layer with the inputs to the position-wise feed-forward layer to generate a residual output, and
   a layer normalization layer that applies layer normalization to the residual output.

7. The system of claim 1, wherein each subnetwork comprises:
   a self-attention sub-layer that is configured to, at each time step:
      receive an input for each of the plurality of preceding input positions and, for each particular input position of the plurality of preceding input positions:
         apply an attention mechanism over the inputs at each of the plurality of preceding input positions using one or more queries determined according to the input at the particular input position to generate an updated representation for the particular input position.

8. The system of claim 7, wherein each self-attention sub-layer comprises a plurality of self-attention layers, and wherein each self-attention layer is configured to, at each time step:
apply a learned query linear transformation to the input at each particular input position of the plurality of preceding input positions to generate a respective query for each particular input position,
apply a learned key linear transformation to each input at each particular input position of the plurality of preceding input positions to generate a respective key for each particular input position,
apply a learned value linear transformation to each input at each particular input position of the plurality of preceding input positions to generate a respective key for each particular input position, and
for each of the particular input positions of the plurality of preceding input positions,
determine a respective input-position specific weight for the particular input position by applying a comparison function between the query for the particular input position and the keys, and
determine an initial attention output for the particular input position by determining a weighted sum of the values weighted by the corresponding input-position specific weights for the particular input position.

9. The system of claim 8, wherein the self-attention sub-layer is configured to, at each time step, combine the attention outputs generated by the self-attention layers to generate the output for the self-attention sub-layer.

10. The system of claim 8, wherein the attention layers operate in parallel.

11. The system of claim 7, wherein each subnetwork further comprises:
a residual connection layer that combines the outputs of the self-attention sub-layer with the inputs to the self-attention sub-layer to generate a residual output, and
a layer normalization layer that applies layer normalization to the residual output.

12. One or more non-transitory computer storage media storing instructions that when executed by one or more computers cause the one or more computers to implement a neural network for generating a network output by processing an input sequence having a respective network input at each of a plurality of input positions in an input order, the neural network comprising:
a first neural network comprising a sequence of one or more subnetworks, each subnetwork configured to, at each of a plurality of time steps, (i) receive a respective subnetwork input for each of a plurality of preceding input positions that precede a current input position corresponding to the time step, and (ii) generate a respective subnetwork output for each preceding input position, and wherein each subnetwork comprises:
a self-attention sub-layer that is configured to, at each time step, receive the respective subnetwork input for each of the plurality of preceding input positions and, for each particular input position of the preceding input positions:
apply a self-attention mechanism over the subnetwork inputs at the preceding input positions to generate a respective output for the particular input position, wherein applying a self-attention mechanism comprises: determining a query according to the subnetwork input at the particular input position, determining keys according to the subnetwork inputs at the preceding input positions, determining values according to the subnetwork inputs at the preceding input positions, and using the determined query, keys, and values to generate the respective output for the particular input position.

13. The non-transitory computer storage media of claim 12, wherein:
the network output is an output sequence having a respective network output at each of a plurality of output positions in an output order; and
the first neural network auto-regressively generates the output sequence, by at each of a plurality of time steps, generating a network output at an output position corresponding to the time step conditioned on the subnetwork inputs and network outputs at output positions preceding the output position in the output order.

14. The non-transitory computer storage media of claim 12, wherein the first neural network further comprises:
an embedding layer configured to, at each time step:
for the network input at each of the plurality of preceding input positions:
map the network input to an embedded representation of the network input, and
combine the embedded representation of the network input with a positional embedding of the corresponding input position of the network input in the input order to generate a combined embedded representation of the network input; and
provide the combined embedded representations of the network input as input to a first subnetwork in the sequence of subnetworks.

15. The non-transitory computer storage media of claim 12, wherein at least one of the subnetworks comprises:
a position-wise feed-forward layer that is configured to, at each time step:
for each particular input position of the plurality of preceding input positions:
receive an input at the particular input position, and
apply a sequence of transformations to the input at the particular input position to generate an output for the particular input position.

16. The non-transitory computer storage media of claim 12, wherein each subnetwork comprises:
a self-attention sub-layer that is configured to, at each time step:
receive an input for each of the plurality of preceding input positions and, for each particular input position of the plurality of preceding input positions:
apply an attention mechanism over the inputs at each of the plurality of preceding input positions using one or more queries determined according to the input at the particular input position to generate an updated representation for the particular input position.

17. A method comprising:
receiving an input sequence having a respective input at each of a plurality of input positions in an input order;
processing the input sequence through a first neural network to generate a network output, the first neural network comprising a sequence of one or more subnetworks,
wherein each subnetwork is configured to, at each of a plurality of time steps, (i) receive a respective subnetwork input for each of a plurality of preceding input positions that precede a current input position corresponding to the time step, and (ii) generate a respective subnetwork output for each preceding input position, and wherein each subnetwork comprises:

a self-attention sub-layer that is configured to, at each time step, receive the respective subnetwork input for each of the plurality of preceding input positions and, for each particular input position of the preceding input positions:

apply a self-attention mechanism over the subnetwork inputs at the preceding input positions to generate a respective output for the particular input position, wherein applying a self-attention mechanism comprises: determining a query according to the subnetwork input at the particular input position, determining keys according to the subnetwork inputs at the preceding input positions, determining values according to the subnetwork inputs at the preceding input positions, and using the determined query, keys, and values to generate the respective output for the particular input position.

18. The method of claim 17, wherein:
the network output is an output sequence having a respective network output at each of a plurality of output positions in an output order; and
the first neural network auto-regressively generates the output sequence, by at each of a plurality of time steps, generating a network output at an output position corresponding to the time step conditioned on the subnetwork inputs and network outputs at output positions preceding the output position in the output order.

19. The method of claim 17, wherein the first neural network further comprises:
an embedding layer configured to, at each time step:
for the network input at each of the plurality of preceding input positions:
map the network input to an embedded representation of the network input, and
combine the embedded representation of the network input with a positional embedding of the corresponding input position of the network input in the input order to generate a combined embedded representation of the network input; and
provide the combined embedded representations of the network input as input to a first subnetwork in the sequence of subnetworks.

20. The method of claim 17, wherein at least one of the subnetworks comprises:
a position-wise feed-forward layer that is configured to, at each time step:
for each particular input position of the plurality of preceding input positions:
receive an input at the particular input position, and
apply a sequence of transformations to the input at the particular input position to generate an output for the particular input position.

* * * * *